(12) United States Patent
Hahn

(10) Patent No.: US 6,525,656 B1
(45) Date of Patent: Feb. 25, 2003

(54) SYSTEM FOR PROVIDING ADVANCED WARNING AND ROAD USER INFORMATION

(75) Inventor: Stefan Hahn, Ulm (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/834,251

(22) Filed: Apr. 12, 2001

(51) Int. Cl.[7] .................................................. B60Q 1/22
(52) U.S. Cl. ........................ 340/463; 340/471; 340/479
(58) Field of Search ................................ 340/463, 464, 340/435, 436, 580, 583, 903, 905, 471, 929, 552, 554, 902; 434/307 R; 369/1, 4

(56) References Cited

U.S. PATENT DOCUMENTS

| | | | | |
|---|---|---|---|---|
| 5,247,280 A | * | 9/1993 | Incorvaia et al. ............ | 340/458 |
| 5,714,927 A | * | 2/1998 | Henderson et al. .......... | 340/903 |
| 5,796,344 A | * | 8/1998 | Mann et al. ................. | 340/905 |
| 5,903,217 A | * | 5/1999 | Stanczak et al. ............. | 340/554 |
| 5,984,570 A | | 11/1999 | Parashar ....................... | 404/14 |
| 6,025,775 A | | 2/2000 | Erlandson .................... | 340/436 |

\* cited by examiner

Primary Examiner—Van Trieu
(74) Attorney, Agent, or Firm—Pendorf & Cutliff

(57) ABSTRACT

The invention concerns a system for providing advanced warning or advanced information of other road users via a vehicle, which includes an optical signal device for detection of other road users, with a sensor for automatic recognition of situations, which may possibly require an advanced warning or advanced information for other road users. When such a situation is recognized, the signal device is activated at least once for a short duration, of which the duration is below the conscious detection threshold and above the subconscious detection threshold of the road user.

23 Claims, 2 Drawing Sheets

SWT = SUBCONSCIOUS WARNING THRESHOLD
CTR = CONSCIOUS THRESHOLD OF RECOGNITION

SWT = SUBCONSCIOUS WARNING THRESHOLD
CTR = CONSCIOUS THRESHOLD OF RECOGNITION

SYSTEM FOR PROVIDING ADVANCED WARNING AND ROAD USER INFORMATION

BACKGROUND OF THE INVENTION

1. Field of the Invention

The invention concerns a system for providing advanced warning and road user information using optical signal devices.

2. Description of the Related Art

Systems for warning other road users include vehicle mounted devices such as brake lights, which signal a slowing down to following traffic. The brake lights are activated as soon as the driver operates the brake pedal. Another known means for providing optical information to road users is a traffic light, which regulates traffic using a light signal and which informs road users regarding an actual traffic situation.

Above all, with respect to brake lights and their control, various modifications have been proposed for increasing traffic safety. These modifications are on the one hand concerned with the geometric design or more specifically the dynamic change of the image of the brake lights, for example by blinking signals, and on the other hand are concerned with an advancement of the time point at which the brake lights are activated, for example in response to a rapid removal of the foot from the gas pedal, such as described in DE-A-197 13 235.

In DE-A-197 22 775 it is proposed to constantly monitor the instantaneous acceleration and deceleration with the aid of a sensor, and on the basis of the sensor signal, to control the electrical supply to the brake lights according to a predetermined algorithm. Besides this, it has been proposed to utilize no-lagtime switchable light sources such as light diodes for the brake lights, in order to produce a flashing light. In a further development, the light diodes are illuminated with a flicker frequency not detectable by the human eye, but which can be detected by a light receiver in the following vehicle, in order to actuate a warning sound or a forced braking.

This type of modification of the brake lights and their controls however violate the legal regulations and the conventions of street traffic. In particular, the activation of the brake lights is legally limited to the operation of the brake pedal by the vehicle operator or the activation of the brakes by an automatic guidance of an electronic stabilization program. The invisible coding in the brake light as known from DE-A-197 22 775 is only effective when the following traffic employs the corresponding light receiver.

From DE 199 52 408 A1, which belongs to the subsequently published state of the art, a system for controlling an optical signal device in a vehicle is known, via which other road users are warned or informed. The system includes a sensor capable of recognition of situations regarding which other road users should be warned as early as possible, without violating any laws and without requiring the other road users to have particular technical devices for reception of the warning or information signal. For this, the system operates a signaling device, which is so controlled, that it is activated at least one time for a short duration, which is below the threshold of consciousness and above a subconscious warning detection threshold of the road users. Therein the subconscious warning threshold is defined as the signal display duration, at which the information is just barely subconsciously recognized, that is, it has an effect on the later behavior of the target person, and the conscious threshold of recognition is defined as the display duration, at which the target person becomes conscious of the information. Herein use is made of the recognition that optical information, which is offered for such a short period of time that it cannot be consciously processed, nevertheless is received by persons. This phenomenon, known as "visual priming", is described for example by A. J. Marcel in *Conscious and unconscious perception: Experiments on visual masking and word recognition*, Cognitive Psychology 15 (1983), S. 197–237. A well known example of this phenomenon is the substitution of individual frames of a film sequence with others containing completely different content, which the observer cannot recognize consciously while watching the film, however nevertheless has an effect upon his understanding or, as the case may be, behavior.

SUMMARY OF THE INVENTION

The task of the invention is to find a new type of system for providing advanced warning and advanced information to road users via an optical signal device.

The inventive system preferably takes advantage of the process known from subsequently published state of the art DE 199 52 408 A1, concerning subconscious broadcasting and perception of information. In the present application the functionality of such a system is extended in particularly useful manner by a new type of design into the possibility of general employment in connection with optical signal devices in traffic.

Thus it is for example conceivable to so design or equip a traffic light in accordance with the invention, that prior to an actual signal change, the light to be activated precedes its change in display by a subconsciously perceivable flash or, as the case may be, blinking. In this manner the road users would receive early warning and could adapt their speed, so that failures to stop for red lights could in many cases be avoided. It is further conceivable to equipment the traffic light with a device for recognition of road users, so that in the case that a road user is using or crossing a road without permission (above all pedestrians in the case that the pedestrian signal has already switched to red) this information is transmitted to a vehicle operator who could endanger this road user (pedestrian) by an inventive signal generation of the traffic light. Thus the vehicle operator, even though the light may have turned green, may be sensitized by an subconscious detectable illumination of the red light signal to sensitize him to a dangerous situation; for example, the case that a pedestrian is crossing the vehicle lane without permission.

For a more detailed discussion of advantageous possibilities of the embodiments and further developments of the invention, in the following an optical signal device designed in accordance with the invention will be described as provided on a vehicle, in particular a brake light.

Such a design of the invention is used for achieving the effect particularly for warning other road users. It has been shown, that a warning by appropriate short time pulsing of brake lights below the conscious detectable threshold substantially reduces the reaction time of the operator of a following vehicle, when the braking situation, for which he has been subconsciously prepared, actually occurs.

Different from the relatively high frequency modulated brake light known from DE-A-197 22 775, in which the modulation is not recognized, but the brake light itself as such however is very well recognized by other road users, in accordance with the present invention the optical warning signal is presented with such a duration, that as a rule it is not consciously recognized by other road users, however sharpens their alertness.

In this embodiment of the inventive system the signaling device is normally activated for a short time period immediately after recognition of an appropriate situation. It is however also possible, depending upon the situation, to wait with the subconscious sensitization of the other road users.

As already mentioned, the inventive system is particularly suitable for warning following vehicles of possible imminent braking maneuvers by subconscious influencing, with no difference in the actual brake signal which provides a consciously detected impression in the from that is conventional today, so that the legal requirements are satisfied. Besides this, no technical pre-requisites are required of the following vehicles.

On the basis of these characteristics of the invention further developments or refinements are possible, which by themselves are known, but which for the above mentioned reasons could not yet be put into use. For example, warning signals with different levels of intensity can be produced, which, depending upon the likelihood or degree of confidence with which the brake maneuver can be predicted, causes the brake lights to be illuminated for a short period of time at various intensities. With high confidence of braking it is possible to additionally activate other lights, in order to amplify the subconscious warning signals, for example the backup lights, insofar as they are not already illuminated. In the case of prediction of danger with high probability, the short time light signals could also be repeated multiple times with short intervals, so long as they do not follow each other with such short intervals that they can be consciously recognized.

The invention is not only useful in connection with brake lights, but rather also in connection with other optical signal devices in the vehicle, for example fog lights, which can be turned on for short periods when a fog detector detects approaching fog.

Besides this, the invention is not limited to the advance warning of dangerous situations. One could also sensitize other road users subconsciously to situations, in which a danger is not imminently threatening, wherein it could however be useful, when the other road users are informed in advance, without having to consciously process this information. For example, if a vehicle becomes position on a turnoff lane, without having turned on a turn signal, and this is detected by an appropriate sensor, the operator of the following vehicle could be spurred to recognize, on the basis of short time, not consciously recognizable blinking signal lights, that he is on a turnoff lane, and if necessary could change lanes in time.

Devices for automatic recognition of situations, in which following road users are warned for example of an approaching braking situation, include for example a sensor for detecting the speed with which a regulator (e.g., gas pedal) for the propulsion energy of the vehicle is withdrawn, a sensor for detecting the approach of the vehicle operator to a brake pedal, a sensor for detecting the speed of the vehicle, a sensor for detecting the acceleration and/or deceleration of the vehicle, a sensor for detecting the distance and/or speed of preceding and/or following vehicles, a sensor for detecting warning signals of preceding vehicles and a sensor for detecting traffic situations or light signals or displays.

In the case that the inventive system is employed in advantageous manner in a vehicle, in particular an automobile, the regulator or controller for the propulsion energy is normally the gas pedal and the brake operating device is normally the brake pedal. The invention can also be used in a motorcycle, wherein for example operation of the throttle grip and the hand brake levers are detected, and even in non-motorized vehicles such as bicycles.

The short time, during which the signal device is activated, after which the appropriate situation has been recognized, is preferably approximately ten milliseconds to several tens of milliseconds, for example twenty or thirty milliseconds. For the purpose of production of such short time light signals in economic manner the signal device preferably is provided with one or more light emitting electronic components such as light emitting diodes.

BRIEF DESCRIPTION OF THE INVENTION DRAWINGS

In The following an illustrative embodiment is described in greater detail on the basis of the figures, wherein.

DETAILED DESCRIPTION OF THE INVENTION

Figure 1:
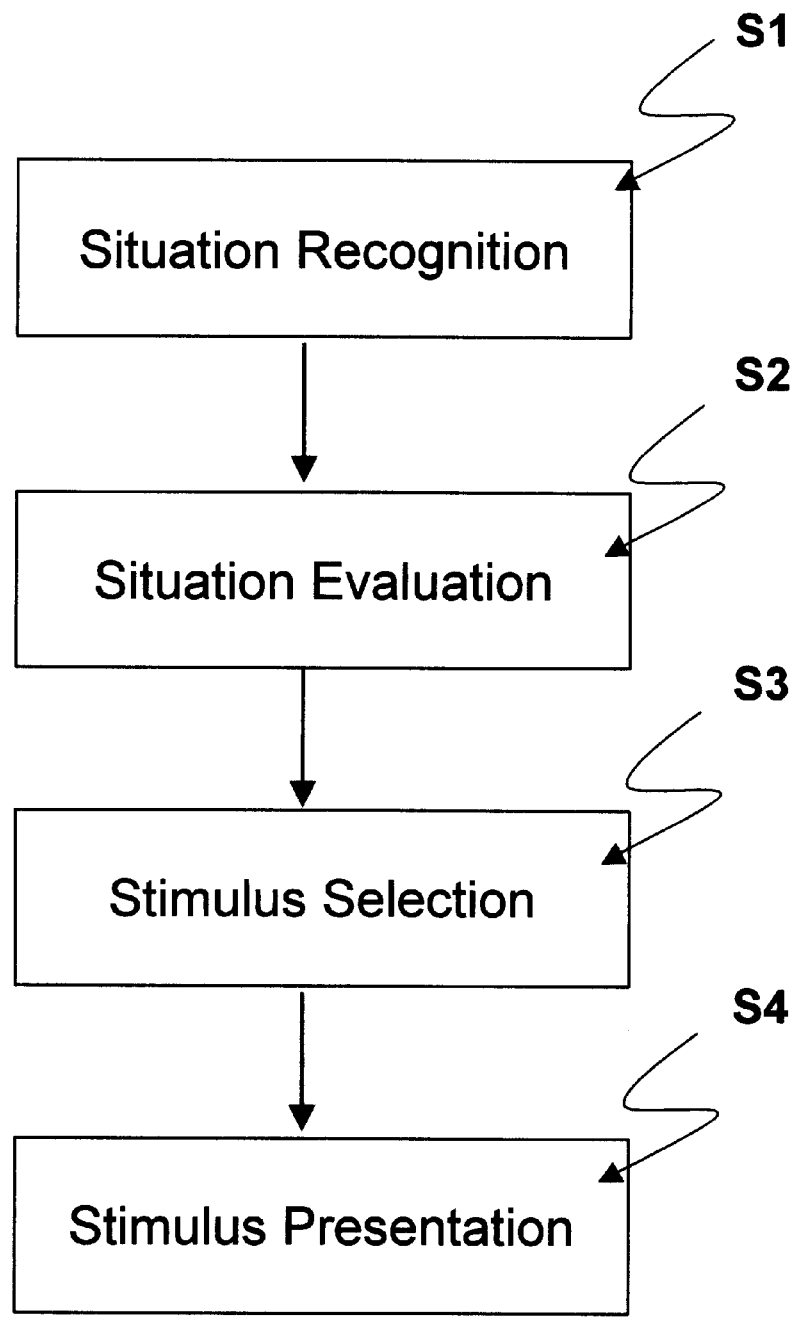
FIG. 1 is a flow diagram of the operating principle of a vehicle advance warning system, via which other road users can be given advance warning by a short duration light signal.
Figure 2:
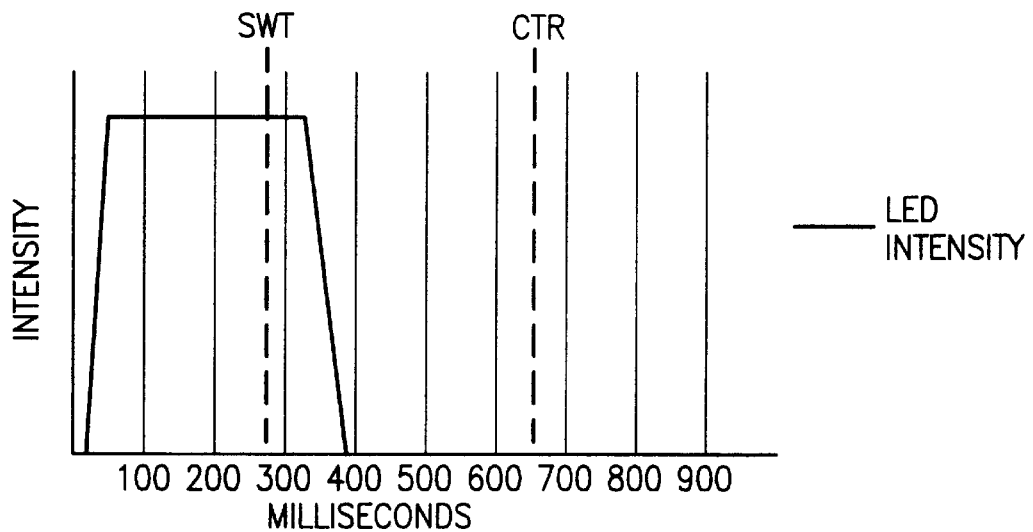
FIG. 2 is a time vs. illumination intensity plot for a signal according to the present invention.
Figure 3:
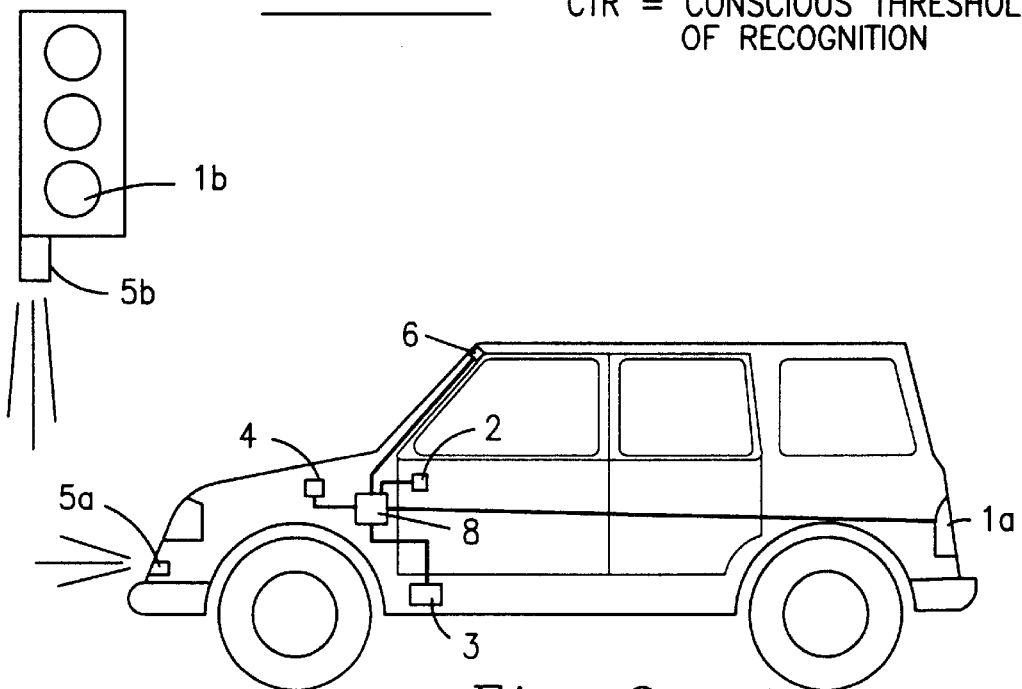
FIG. 3 shows the system components in place on a vehicle operating on the road.

A motorized vehicle, in which the advance warning system is realized, includes sensors for detecting movement within the internal space of the vehicle such as, for example, sensors or proximity detectors for detecting or predicting an operation of gas and/or brake pedal, sensors for detecting speed, acceleration and/or deceleration of the vehicle, sensors for detecting the external environment towards the front or the rear, for example for detecting the distance and/or relative speed of preceding and/or following vehicles, and/or sensors for detecting warning blinking signals of preceding vehicles or red traffic lights.

Besides this, the vehicle includes brake lights, which respectively include a plurality of light emitting diodes.

After one or more of the sensors have detected a situation in which the operator of the vehicle possibly will operate the brake (S1), the detected situation is evaluated with respect to its danger or hazard potential or its importance (S2). Subsequently there occurs the selection (S3) of a suitable optical sensitization signal, in order to sensitize the operator of the following vehicles to the possible braking process. If for example the operator of the vehicle with the advance warning system rapidly removes his foot from the gas pedal, then a normal danger situation is presumed, and both brake lights could be allowed to flas for, for example, twenty milliseconds (S4). If a supplemental danger potential is recognized, for example a narrow separation from a preceding vehicle, so then a stronger sensitizing signal can be selected, in that the process step (S4) in addition to the normal brake lights additionally permits a short lighting up of the supplemental brake light on the vehicle and/or the reverse light. Besides this, the optical sensitizing signal can be repeated multiple times. These process steps can be appropriately carried out or controlled by a suitably programmed microprocessor.

The period, for which the brake lights are illuminated, is suitably selected by carrying out tests, and is selected to be so short, that it is just below the conscious threshold of detection of the following vehicles.

On the basis of the integration or accommodation effect in the eye it is possible, that the use of the system at night or in darkness would become consciously recognized by the road user being warned, who's view is on the system, even though the duration of the illumination as selected to be so short, that it is intended not to have been recognized. Since this condition might lead to legal problems (laws governing the operation of vehicles), it is possible in practice to design the system such that it can be deactivated. Thereby it is conceivable that the deactivation is conducted manually by the vehicle operator or by sensors which measure the ambient light level so that if the vehicle is surrounded by darkness the inventive warning system is deactivated. On the other hand, the system can also be suitably so designed, so that the duration of the illumination can be selectively varied. This is particular accomplished using devices which evaluate the instantaneous optical condition (such as for example daylight, dusk, darkness).

What is claimed is:

1. A system for providing advanced warning or advanced information to road users via an optical signal device,
    wherein the signal device is activated at least one time for a short duration, and
    wherein the duration of activation is so selected, that it is below the threshold of consciousness and above the subconscious of threshold of recognition of the road user.

2. A system according to claim 1, wherein said system utilizes a sensor for automatic recognition of situations, in which an advanced warning or advanced information for other road users would be useful.

3. A system according to claim 2, wherein the sensor comprises one or more of the following devices:
    a sensor for detecting the speed of another vehicle or road user,
    a sensor for detecting the operation of a vehicle brake,
    a sensor for detecting the speed of the vehicle in which it is located,
    a sensor for detecting the acceleration and/or deceleration of the vehicle in which it is located,
    a sensor for detecting the distance to and/or speed of preceding and/or following vehicles from the vehicle in which it is located,
    a sensor for detecting warning signals of preceding vehicles,
    a sensor for detecting road signs or illuminated signs,
    a sensor for detecting other road users and their interaction with the traffic.

4. A system according to claim 1, wherein the signal device is activated for a predetermined duration, after a situation has been recognized, of which road users should be warned or for which they should be informed.

5. A system according to claim 4, wherein the signal device is activated for approximately ten to fifty milliseconds long.

6. A system according to claim 4, wherein the signal device is activated for approximately twenty to thirty milliseconds long.

7. A system according to claim 1, wherein the signal device includes one or more light emitting electronic components.

8. A system according to claim 7, wherein said light emitting electronic components are light emitting diodes.

9. A system according to claim 1, wherein the system can be deactivated.

10. A system according to claim 9, wherein the deactivation of the system can be manually undertaken by a vehicle operator or a vehicle occupant.

11. A system according to claim 9, wherein the deactivation of the system can be undertaken by a sensor measuring the light condition in the environment of the vehicle.

12. A system according to claim 1, wherein the duration of the optical signal device can be selectively adjusted.

13. A system according to claim 12, wherein the adjustment of the system can be manually undertaken by a vehicle operator or a vehicle occupant.

14. A system according to claim 12, wherein the adjustment of the system can be undertaken by a sensor measuring the light condition in the environment of the vehicle.

15. A vehicle including a system for providing advanced warning or advanced information to other road users via an optical signal device,
    wherein the signal device is visible to other road users,
    wherein the signal device is activated at least one time for a short duration, and
    wherein the duration of activation is so selected, that it is below the threshold of consciousness and above the subconscious of threshold of recognition of the road user.

16. A traffic light signal including a system for providing advanced warning to road users,
    wherein the traffic light signal is activated at least one time for a short duration, and
    wherein the duration of activation is so selected, that it is below the threshold of consciousness and above the subconscious of threshold of recognition of the road user.

17. A traffic light signal as in claim 16, wherein said traffic light signal is activated at least once for a short duration prior to the occurrence of a change in the traffic signal.

18. A traffic light signal as in claim 16, further including a sensor for detecting the presence of a pedestrian crossing the road when the traffic light is green,
    wherein said traffic light signal is activated at least once to provide a supplemental signal having a short duration upon detection of a pedestrian crossing the road when the traffic light is green.

19. A system for providing advanced warning of an event to road users via an optical signal device,
    said system receiving input from at least one sensor which input is a predictor that said event may occur,
    said system activating said optical signal device at least one time for a short duration in response to said sensor input to provide an advanced warning optical signal, wherein the duration of said advanced warning optical signal is so selected, that it is below the conscious threshold of recognition and above the subconscious threshold of recognition of the road user being warned,
    said system subsequently providing an actual warning optical signal upon the actual occurrence of said event, said actual warning optical signal having a duration above the conscious threshold of recognition of the road user being warned.

20. A system as in claim 19, wherein said actual warning signal is a signal selected from the group consisting of a traffic light, an electrical traffic information sign, a brake light, a flashing light, a fog lamp, a rear fog lamp, and a turn signal.

21. A system for providing an advanced warning of an event outside a vehicle to an operator of the vehicle via an optical signal device, said system receiving input from at least one sensor which input is a predictor that said event may occur, said system activating said optical signal device at least one time for a short duration in response to said sensor input to provide an advanced warning optical signal to said operator of said vehicle, wherein the duration of said advanced warning optical signal is so selected, that it is below the conscious threshold of recognition and above the subconscious threshold of recognition of said vehicle operator, said system providing a actual warning optical signal upon the actual occurrence of said event, said actual warning optical signal having a duration above the conscious threshold of recognition.

22. A system as in claim 21, wherein said sensor and said optical signal device are installed in the vehicle of the vehicle operator, wherein said optical signal is displayed to the vehicle operator, and wherein said event is a deceleration of a preceding vehicle.

23. A system as in claim 21, wherein said sensor and said optical signal device are installed in a preceding vehicle, wherein said optical signal is displayed to the vehicle operator following said preceding vehicle, and wherein said event is a deceleration of said preceding vehicle.

* * * * *